(12) United States Patent
Vanapalli et al.

(10) Patent No.: US 10,733,131 B1
(45) Date of Patent: Aug. 4, 2020

(54) TARGET PORT SET SELECTION FOR A CONNECTION PATH BASED ON COMPARISON OF RESPECTIVE LOADS

(71) Applicant: HEWLETT PACKARD ENTERPRISE DEVELOPMENT LP, Houston, TX (US)

(72) Inventors: Sudheer Vanapalli, Karnataka (IN); Krishna Babu Puttagunta, Rocklin, CA (US); Rupin T. Mohan, Northborough, MA (US); Vivek Agarwal, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/264,918

(22) Filed: Feb. 1, 2019

(51) Int. Cl.
G06F 13/40 (2006.01)
G06F 13/16 (2006.01)

(52) U.S. Cl.
CPC ...... G06F 13/4027 (2013.01); G06F 13/1668 (2013.01)

(58) Field of Classification Search
CPC combination set(s) only.
See application file for complete search history.

(56) References Cited

U.S. PATENT DOCUMENTS

| | | |
|---|---|---|
| 6,473,424 B1 | 10/2002 | DeJager et al. |
| 6,775,230 B1 | 8/2004 | Watanabe et al. |
| 6,976,134 B1 * | 12/2005 | Lolayekar ............ G06F 3/0613 709/214 |
| 7,554,914 B1 | 6/2009 | Li et al. |
| 7,657,613 B1 | 2/2010 | Hanson et al. |
| 7,768,907 B2 | 8/2010 | Hua et al. |
| 8,155,518 B2 | 4/2012 | Young |
| 8,307,359 B1 | 11/2012 | Brown et al. |
| 8,341,308 B2 | 12/2012 | Allen et al. |
| 8,446,916 B2 | 5/2013 | Aybay et al. |
| 8,488,456 B2 | 7/2013 | Battestilli et al. |
| 8,621,029 B1 | 12/2013 | Grier et al. |
| 9,521,085 B1 | 12/2016 | Watson et al. |
| 2004/0078521 A1 | 4/2004 | Hawks et al. |
| 2006/0056293 A1 | 3/2006 | Kumagai et al. |
| 2007/0130344 A1 * | 6/2007 | Pepper ................ G06F 3/0613 709/227 |
| 2007/0174851 A1 | 7/2007 | Smart |

(Continued)

FOREIGN PATENT DOCUMENTS

EP 1131933 A2 9/2001
WO WO-2017/023271 A1 2/2017

OTHER PUBLICATIONS

Castillo, B. et al., "IBM PowerVM Getting Started Guide," IBM, International Technical Support Organization, Feb. 2012, (Research Paper), 104 pages.

(Continued)

*Primary Examiner* — Raymond N Phan
(74) *Attorney, Agent, or Firm* — Trop, Pruner & Hu, P.C.

(57) ABSTRACT

In some examples, to define a connection path of an initiator to target ports of a plurality of controller nodes that manage access of data in a storage system, a provisioning system determines loads of respective sets of target ports, and selects a selected set of target ports from among the sets of target ports for inclusion in the connection path based on the determined loads.

20 Claims, 3 Drawing Sheets

(56) References Cited

U.S. PATENT DOCUMENTS

| | | | |
|---|---|---|---|
| 2007/0208836 A1 | 9/2007 | Madnani et al. | |
| 2008/0127199 A1 | 5/2008 | Miki | |
| 2009/0287898 A1 | 11/2009 | Hara | |
| 2010/0198972 A1* | 8/2010 | Umbehocker | G06F 3/0604 709/226 |
| 2010/0223404 A1 | 9/2010 | Butler et al. | |
| 2011/0228698 A1 | 9/2011 | Kato et al. | |
| 2011/0302339 A1 | 12/2011 | Umezawa | |
| 2011/0320706 A1 | 12/2011 | Nakajima | |
| 2012/0163797 A1* | 6/2012 | Wang | H04L 45/22 398/2 |
| 2012/0284556 A1 | 11/2012 | Akirav et al. | |
| 2012/0303701 A1 | 11/2012 | Singh et al. | |
| 2013/0091102 A1 | 4/2013 | Nayak | |
| 2013/0173784 A1 | 7/2013 | Wang et al. | |
| 2013/0308455 A1 | 11/2013 | Kapadia et al. | |
| 2014/0140216 A1 | 5/2014 | Liu et al. | |
| 2017/0041404 A1 | 2/2017 | Burbridge | |
| 2017/0251083 A1 | 8/2017 | Burbridge et al. | |

OTHER PUBLICATIONS

Emulex, "Emulex Delivers High Performance to Data Deduplication Applications," (Web Page), copyright 2010, Solutions Brief, 3 pages.

European Patent Office, "Extended European Search Report", received in EP Application No. 14901110.8, dated Apr. 4, 2018.

International Search Report & Written Opinion received in PCT Application No. PCT/US2014/045204, dated Mar. 12, 2015, 11 pages.

International Search Report & Written Opinion received in PCT Application No. PCT/US2014/054174, dated May 21, 2015, 9 pages.

Khazali, I. et al., "Load Balancing with Minimal Flow Remapping for Network Processors," (Research Paper). Computers and Communications (ISCC), 2012 IEEE Symposium on, IEEE, Jul. 1-4, 2012, pp. 662-666.

Parker, K. W., "SCSI Socket Services (SSS) Review 97-11-05 Project T10/1246-D," Nov. 11, 1997, 7 pages.

VMWare.com, "Path Management and Manual, or Static, Load Balancing", available online at <http://pubs.vmware.com/vsphere-4-esx-vcenter/index.jsp?topic=/com.vmware.vsphere.config_iscsi.doc_ 41/sx _ son _ config/managing_ san _ systeme/c _path_ management_ and_ manual _load _balancing html>, retrieved on Oct. 16, 2018, 1 pages.

Wikipedia, World Wide Name last edited Oct. 11, 2018 (4 pages).

* cited by examiner

TARGET PORT SET SELECTION FOR A CONNECTION PATH BASED ON COMPARISON OF RESPECTIVE LOADS

BACKGROUND

A storage system can include a storage device or an array of storage devices to store data. The storage system may be accessible by initiators over a network. A controller node can be used to manage access of data in the storage system. In some examples, for fault tolerance, multiple controller nodes can be used to manage access of data in the storage system. An initiator can access the storage system using a primary controller node, and in case of a fault of the primary controller node, can failover to a backup controller node to access the storage system.

BRIEF DESCRIPTION OF THE DRAWINGS

Some implementations of the present disclosure are described with respect to the following figures.

Figure 1:
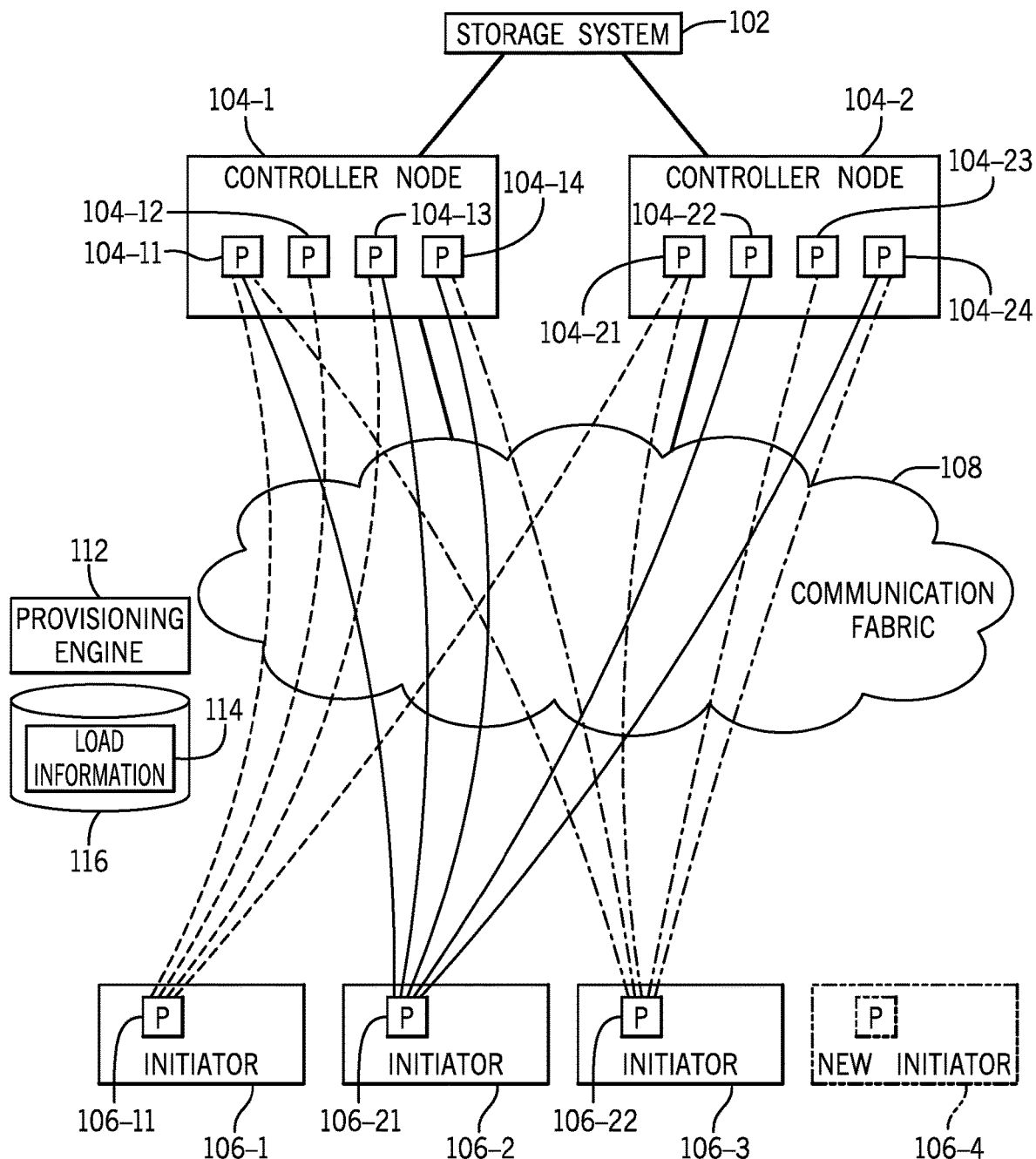
FIG. 1 is a block diagram of an arrangement that includes initiators, controller nodes, and a storage system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "controller node" refers to a physical or logical node that manages access of data in a storage system, which can include a storage device or an array of storage devices. A physical "node" can refer to a physical processing resource, which can include any combination of the following: a hardware processor (or multiple hardware processors), a computer (or multiple computers), or any other processing resource. A physical node can also include machine-readable instructions executable on the processing resource of the physical node. A hardware processor can include a microprocessor, a core of a multi-core microprocessor, a microcontroller, a programmable integrated circuit, a programmable gate array, a digital signal processor, or another hardware processing circuit. In some examples, a node or controller node may be a storage controller of a storage array. In examples described herein, a storage device may be a hard disk drive (HDD), a solid state drive (SSD) such as a flash device, a persistent memory (e.g., storage-class memory) device, or the like, and an array or plurality of storage devices may include any combination of such storage devices.

A virtual "node" can refer to a partition within a physical system (including a computer or multiple computers). Examples of the partition can include a virtual machine, a container, and so forth. The virtual node can also include machine-readable instructions executable in the partition.

The controller node can be part of the storage system, or can be separate from the storage system. The controller node has target ports to which initiators can send access requests to access data of the storage system. An initiator has an initiator port (or multiple ports) to allow the initiator to communicate with controller node(s).

A "port" can refer to a physical or logical interface of the controller node that is coupled to a network, such as a storage area network (SAN), a local area network (LAN), a wide area network (WAN), and so forth. An initiator or controller node can include a physical port (or multiple physical ports). In some examples, multiple virtual ports can be defined on a physical port of an initiator or a controller node.

An initiator can refer to a physical or logical entity (e.g., a hardware processor, an input/output (I/O) device, a computer, a program, a virtual machine, a container, etc.) that is able to access data of the storage system.

For fault tolerance, multiple controller nodes can be used for accessing data of the storage system. Multiple controller nodes can also be provided for increased throughput of data access, since loads associated with data access by initiators can be distributed across the controller nodes.

When an initiator is provisioned (i.e., set up for access of the storage system), a connection path can be established between an initiator port of the initiator and a target port of a controller node.

In some cases, a pair of target ports can be considered "partner" ports, in that one of the partner ports of the pair can be considered a primary target port and the other partner port can be considered a backup target port to be used for failover in case of a fault detected at the primary target port. The primary target port can be a target port of a first controller node, and the backup target port can be a target port of a second controller node.

Although reference is made to a pair of target ports as being partner ports, it is noted that in other examples, a set of partner ports can be defined, where the set can include two target ports of respective controller nodes, or can include more than two target ports of respective controller nodes.

In the present disclosure, a connection path can include a path between an initiator port of an initiator and a set of partner ports at respective controller nodes. Thus, such a connection path can include multiple links between the initiator port and respective target ports of the set of partner target ports, e.g., a connection path can include a first link between an initiator port and a first target port of a set of partner ports, a second link between the initiator port and a second target port of the set of partner ports, and so forth. Note that in some cases a connection path can also include just one link between an initiator port and a target port.

In some examples, a connection path between a newly provisioned initiator and target ports of controller nodes can be manually set up by a network administrator. A "newly provisioned initiator" can refer to an initiator that has been added to a system, or an initiator that has been modified in some way and thus is to be set up again in the system due to the modification.

A manual definition of connection paths depends upon the knowledge and expertise of a network administrator. In some cases, manual definition of connection paths may result in connection paths that can overload some target ports of the controller nodes and may underutilize other target ports of the controller nodes. In other cases, automated management systems that define connection paths for newly provisioned initiators may make all target ports of the controller nodes available to the initiators, which can also lead to overloading of some target ports and underutilization of other target ports.

In accordance with some implementations of the present disclosure, to define a connection path of an initiator (e.g., a newly provisioned initiator) to target ports of a plurality of controller nodes that manage access of data in a storage system, a provisioning system determines loads of respective sets of target ports (e.g., pairs of partner ports), and selects a set of target ports from among the sets of target ports for inclusion in the connection path based on the determined loads.

Balancing the load among available target ports can improve overall I/O throughput of a storage system, since overutilization or underutilization of target ports is less likely. In addition, by considering sets of target ports in identifying connection paths between a newly provisioned initiator and controller nodes, load balancing of target ports can be achieved, while providing for redundancy and increased availability in case of target port faults.

FIG. 1 is a block diagram of an example arrangement that includes a storage system 102, which can include a storage device or an array of storage devices.

Controller nodes 104-1 and 104-2 are coupled to the storage system 102. In some examples, the controller nodes 104-1 and 104-2 are separate from the storage system 102, while in other examples, the controller nodes 104-1 and 104-2 are part of the storage system 102.

FIG. 1 also shows initiators 106-1, 106-2, and 106-3 that can be coupled to the controller nodes 104-1 and 104-2 over a communication fabric 108, such as a SAN, a LAN, a WAN, and so forth.

Although a specific number of controller nodes and initiators are depicted in FIG. 1, in other examples, a different number of controller nodes and/or a different number of initiators can be provided.

The controller node 104-1 includes target ports 104-11, 104-12, 104-13, and 104-14, and the controller node 104-2 includes target ports 104-21, 104-22, 104-23, and 104-24. Although the example depicts each controller node as having the same number of target ports, it is noted that in other examples, the controller nodes 104-1 and 104-2 can include different numbers of target ports. Also, each controller node can include a different number of target ports than that depicted in FIG. 1.

Each initiator 106-1 to 106-3 includes a respective initiator port (or multiple initiator ports). For example, the initiator 106-1 includes an initiator port 106-11, the initiator 106-2 includes an initiator port 106-21, and the initiator 106-3 includes an initiator port 106-31. Although FIG. 1 shows each initiator 106-1 to 106-3 as including one initiator port, it is noted that in other examples, an initiator can include multiple initiator ports.

As shown in FIG. 1, each initiator port can be connected over multiple links 110 to respective target ports. For example, the initiator port 106-11 of the initiator 106-1 is connected to target ports 104-11, 104-12, 104-13, and 104-21 over respective links. The initiator port 106-21 of the initiator 106-2 is connected to target ports 104-11, 104-13, 104-14, 104-21, and 104-22 over respective links. The initiator port 106-31 of the initiator 106-3 is connected to target ports 104-11, 104-14, 104-21, 104-23, and 104-24 over respective links 110. Table 1 below illustrates how many initiators are connected to each respective target port 104-11 to 104-24.

| Target Port | Number of Initiators Connected | Load Metric |
|---|---|---|
| 104-11 | 3 | x1 |
| 104-12 | 1 | x2 |
| 104-13 | 2 | x3 |
| 104-14 | 2 | x4 |
| 104-21 | 2 | x5 |
| 104-22 | 1 | x6 |
| 104-23 | 1 | x7 |
| 104-24 | 2 | x8 |

Table 1 shows an example of load information 114 that can be maintained by a provisioning engine 112 according to some implementations of the present disclosure. A data structure containing the load information 114 (e.g., the information of Table 1) can be stored in a storage medium 116 that is part of or that is external of and accessible by the provisioning engine 112.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit. The provisioning engine 112 can be implemented using a computer or multiple computers, in some examples.

Although FIG. 1 shows the provisioning engine 112 as being separate from the controller nodes 104-1 and 104-2, in other examples, the provisioning system 112 can be part of a controller node or part of multiple controller nodes. As a further example, the provisioning system 112 can be part of an initiator or multiple initiators.

The load information 114 of Table 1 includes a Target Port column that includes identifiers of respective target ports 104-11, 104-12, 104-13, 104-14, 104-21, 104-22, 104-23, and 104-24. Table 1 includes a Number of Initiators columns that indicates a number of initiators connected to each respective target port. For example, a first entry of Table 1 indicates that three initiators are connected to the target port 104-11, a second entry of Table 1 indicates that one initiator is connected to the target port 104-12, a third entry of Table 1 indicates that two initiators are connected to the target port 104-13, and so forth.

Table 1 includes a Load Metric column that indicates a current operational load on each respective target port. The load metric included in the Load Metric column can be expressed as I/O operations per second (IOPS) or by some other measure of how much load was measured for the respective target port during a specified time window (e.g., a one-hour time window, a one-day time window, a one-week time window, or any other time window). For example, the first entry of Table 1 indicates that the load metric of the target port 104-11 has a value x1, the second entry of Table 1 indicates that the load metric of the target port 104-12 has a value x2, and so forth.

Although a specific example of load information 114 is shown in Table 1, it is noted that in other examples, the types of load information can be maintained by the provisioning system 112 to track the load of each target port.

In some examples, an initiator port and a target port are each uniquely identified by a respective World Wide Name (WWN). In such examples, the Target Port column of Table 1 can include the respective WWNs of the target ports 104-11 to 104-24. In different examples, different identifiers can be used to identify initiator ports and target ports. In examples where initiator and target ports are identified by WWNs, a connection path between an initiator port and a set of target ports can be referred to as a "WWN path," which is an end-to-end path between an initiator port and target ports of the set of partner ports. A WWN path can also refer to a path between an initiator port and a target port.

Figure 2:
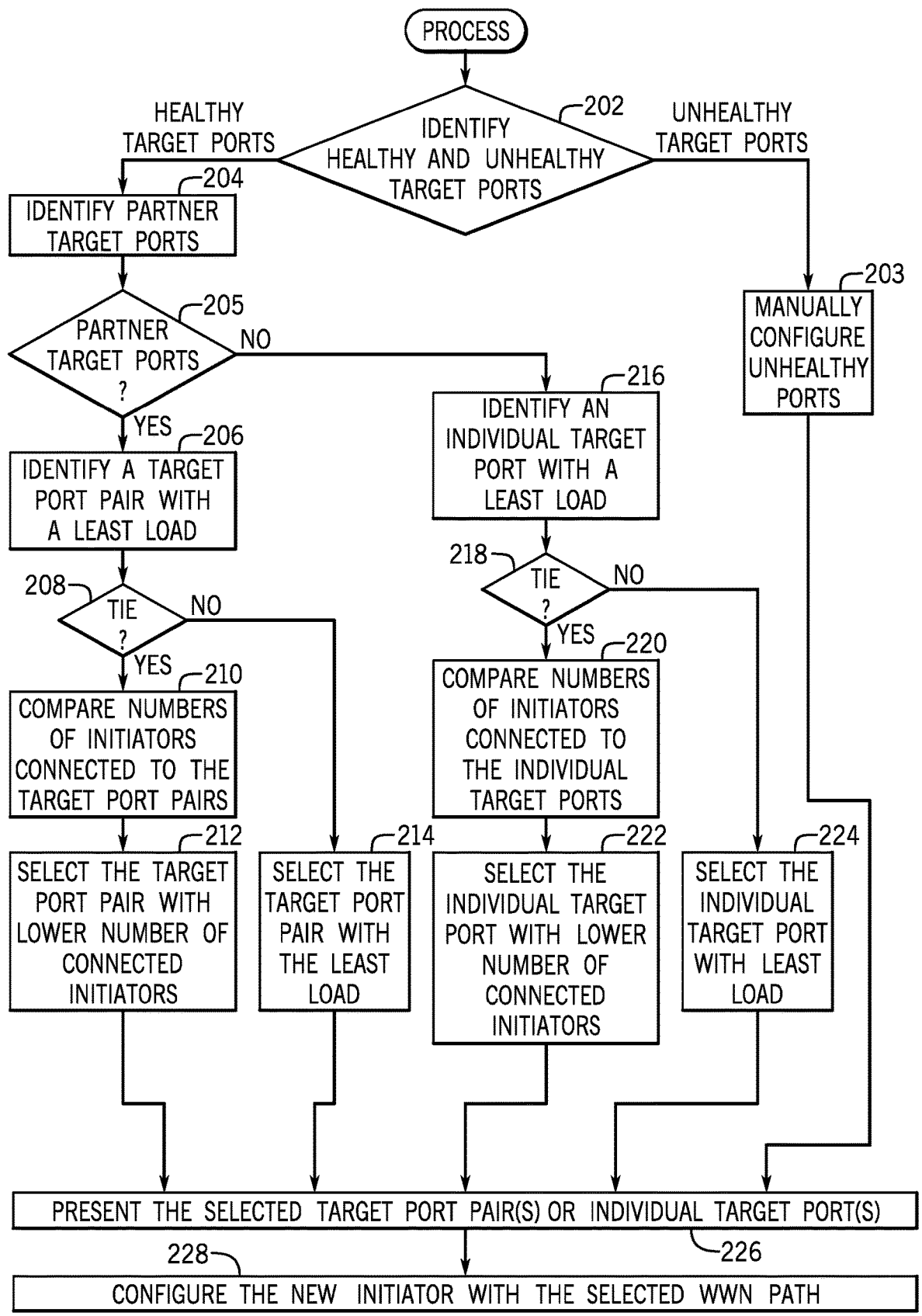
FIG. 2 is a flow diagram of a process according to some examples.

FIG. 2 is a flow diagram of an example process performed by the provisioning engine 112 according to some examples, for provisioning a connection path for a new initiator 106-4 (shown in FIG. 1). The new initiator 106-4 can refer to an initiator added to the arrangement of FIG. 1, where the initiator did not previously exist. Alternatively, the new initiator 106-4 can refer to an initiator that previously existed, but which was modified in some way (e.g., due to a modification of the hardware of the new initiator 106-4 or a program of the initiator 106-4).

Although FIG. 2 depicts a specific order of tasks, it is noted that in other examples, a different order of tasks can be employed, and/or additional or alternative tasks can be provided.

The provisioning engine 112 identifies (at 202) target ports that are considered healthy and target ports that are considered unhealthy. The "health" of a target port can be based on metadata associated with each target port. For example, a monitoring agent (not shown) in a controller node or an initiator may have determined that a target port is not operating in a target fashion, such as due to a hardware fault, a program fault, or a configuration issue. A healthy target port is a target port that operates according to a target specification (e.g., latency is below a specified threshold, throughput is above a specified threshold, error rate is below a specified threshold, etc.). An unhealthy target port is a target port that does not operate according to the target specification.

The identified unhealthy ports can be excluded from inclusion in a connection path, or can be subject to manual configuration (at 203), where a network administrator can determine whether the unhealthy target ports can be fixed and reused.

An automated process can be performed for healthy target ports identified (at 202). In the ensuing discussion, unless reference is made to a target port as being unhealthy, it is assumed that a target port is to a healthy target port.

The provisioning engine 112 identifies (at 204) partner target ports of the controller nodes 104-1 and 104-2. In the present example, it is assumed that partner target ports constitute a pair of target ports (also referred to as a "target port pair") that are provided for redundancy. More generally, the process of FIG. 2 can be applied to sets of target ports, where a set can include two target ports or more than two target ports. Tasks 206, 208, 210, 212, and 214 are performed for each pair of target ports identified.

On the other hand, some of the target ports of the controller nodes 104-1 and 104-2 may not have partner ports. Such target ports are referred to as "individual" ports. Processing of individual target ports are performed by tasks 216, 218, 220, 222, and 224.

The provisioning engine 112 determines (at 205) if partner ports have been identified. If so, the provisioning engine 112 accesses the load information 114 to identify (at 206) a target port pair with a least load during a specified time window (e.g., within the past hour, within the past day, within the past week, or within some other time window). The load of a target port is indicated by the Load Metric column of Table 1, for example.

The load of a target port pair is based on an aggregate (e.g., average, sum, etc.) of the loads of the target ports in the target port pair. For example, if the load of target port 1 in a given target port pair in the specified time window is X, and the load of target port 2 in the given target port pair over the specified time window is Y, then the load of the given target port pair is the average (or other aggregate) of X and Y, for example.

In some cases, there can be a tie in the load of multiple target port pairs. A tie of a first load of a first target port pair and a second load of a second target port pair can be present in response to determining that the first load and the second load are identical or within some specified tolerance of one another (e.g., within some specified percentage of one other).

The provisioning engine 112 determines (at 208) whether there is a tie in the load of multiple target port pairs.

If there is not a tie between multiple target port pairs, the provisioning engine 112 selects (at 214) the target port pair with the least load for inclusion in a WWN path to the new initiator 106-4. Including a target port pair in the WWN path to the new initiator 106-4 refers to including links between the target ports of the target port pair and an initiator port of the new initiator 106-4 in the WWN path.

Note that selecting a target port pair with the least load can refer to selecting just one target port pair, or to selecting multiple target port pairs (e.g., two or a different number of target port pairs) for inclusion in the WWN path. In examples where multiple target port pairs are selected, the target port pairs selected are those with smaller loads than other target port pairs.

However, if the provisioning engine 112 determines (at 208) that there is a tie between multiple target port pairs, then the provisioning engine 112 compares (at 210) the number of initiators connected to each target port pair, such as based on the Number of Initiators information in Table 1 above. In Table 1, assuming that a first target port pair includes target ports 104-11 and 104-21, then the number of initiators connected to the first target port pair is 3+2=6. Assume that a second target port pair that has a load that is tied with the first target port pair includes target ports 104-14 and 104-24. The number of initiators connected to the second target port pair is 2+2=4. In such case, the second target port pair that includes target ports 104-14 and 104-24 has a lower number of initiators connected (4) than the first target port pair (6).

The provisioning engine 112 selects (at 212) the target port pair from among the tied target port pairs with the lower number of initiators connected for inclusion in a WWN path to the new initiator 106-4.

Note that selecting a target port pair with the lower number of initiators connected can refer to selecting just one target port pair, or to selecting multiple target port pairs (e.g., two or a different number of target port pairs) for inclusion in the WWN path. In examples where multiple target port pairs are selected, the target port pairs selected are those with smaller numbers of connected initiators than other target port pairs.

As noted above, tasks 216, 218, 220, 222, and 224 are performed for individual target ports (i.e., those target ports that are not part of target port pairs).

If the provisioning engine 112 determines (at 205) that no partner ports have been identified, the provisioning engine 112 identifies (at 216) an individual target port with the least load over a specified time window (such as based on the load information 114 of Table 1). The provisioning engine 112 determines (at 218) whether there is a tie between the loads of individual target ports. If not, the provisioning engine selects (at 224) the individual target port with the least load for inclusion in a WWN path.

Note that selecting the individual target port with the least load can refer to selecting just one individual target port, or to selecting multiple individual target ports (e.g., four or a different number of individual target ports) for inclusion in the WWN path. In examples where multiple individual target ports are selected, the individual target ports selected are those less loads than other individual target ports.

If the provisioning engine 112 determines (at 218) that there is a tie in the loads between multiple individual target ports, then the provisioning engine 112 compares (at 220) the number of initiators connected to each individual target port, such as based on the Number of Initiators information in Table 1 above.

The provisioning engine 112 selects (at 222) the individual target port from among the tied individual target ports with the lower number of initiators connected for inclusion in a WWN path to the new initiator 106-4.

Note that selecting an individual target port with the lower number of initiators connected can refer to selecting just one individual target port, or to selecting multiple individual target ports (e.g., four or a different number of individual target ports) for inclusion in the WWN path. In examples where multiple individual target ports are selected, the individual target ports selected are those with smaller numbers of connected initiators than other individual target ports.

In some examples, after selection of target port pair(s) or individual target port(s) for inclusion in a WWN path, the selected target port pair(s) and/or selected individual target port(s) can be presented (at 226) to a network administrator for consideration in configuring a WWN path for the new initiator 106-4. For example, the selected target port pair(s) and/or selected individual target port(s) can be presented in a graphical user interface (GUI) on a computer used by the network administrator. As examples, the network administrator can remove a selected target port pair or a selected individual target port from consideration for inclusion in the WWN path. Alternatively, the network administrator can add a target port pair or an individual target port for inclusion in the WWN path.

In response to input from the network administrator, the provisioning engine 112 can configure (at 228) the new initiator 106-4 with the selected WWN path (i.e., the WWN path that includes the target port pair(s) or individual target port(s) as selected by the provisioning engine 112 and/or the network administrator).

In other examples, network administrator involvement can be omitted.

Although reference is made to defining one WWN path for the new initiator 106-4 in FIG. 2, it is noted that in other examples, multiple WWN paths between an initiator port (or multiple initiator ports) of the new initiator 106-4 can be defined by the provisioning engine 112 to respective selected target port pairs or individual target ports.

The process of FIG. 2 can be re-iterated in response to a trigger, such as in response to selection by a user, or in response to some policy-based decision, or in response to addition of a new initiator. For example, if it is detected that I/O throughput of access of the storage system 102 is below a specified threshold or a latency of access has risen above a specified threshold, then reconfiguration of connection paths between initiators and target ports of controller nodes can be triggered. The re-iteration of the process of FIG. 2 to reconfigure connection paths can be part of a policy that governs optimizing connection paths between initiators and the storage system, such as in response to reduced I/O throughput or increased latency or increased error rates.

The provisioning engine 112 can thus balance loads across target ports of controller nodes as part of provisioning initiators, such as provisioning a new initiator or provisioning existing initiators in response to an event. Balancing the loads across target ports can improve bandwidth allocation and increased throughput and reduced latency. By selecting target ports with less load and higher availability (e.g., target ports that are part of partner target ports), over-utilization of target ports can be avoided or made less likely, while enhancing reliability by selecting target ports with redundancy.

Figure 3:
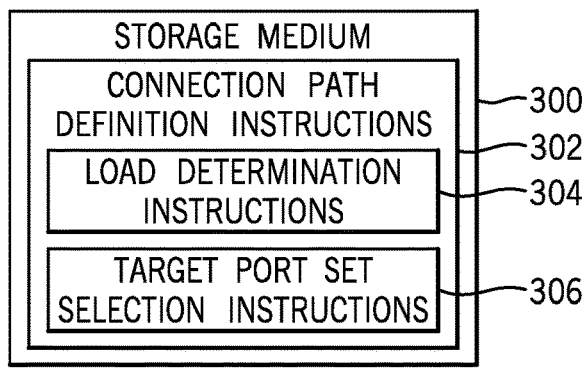
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a provisioning system (e.g., the provisioning engine 112) to perform various tasks.

The machine-readable instructions include connection path definition instructions 302 to define a connection path of an initiator to target ports of a plurality of controller nodes that manage access of data in a storage system. The defining of the connection path is performed as part of provisioning of the initiator for access of the storage system. In further examples, the defining of the connection path is performed based on a policy that governs optimizing connection paths between initiators and the storage system.

The connection path definition instructions 302 include load determination instructions 304 to determine loads of respective sets of target ports (e.g. pair of target ports). The determination of loads of respective sets of target ports can be based on load information (e.g., 114 in FIG. 1).

The connection path definition instructions 302 include target port set selection instructions 306 to select a selected set of target ports from among the sets of target ports for inclusion in the connection path based on the determined loads. Selecting the selected set of target ports for inclusion in the connection path includes connecting an initiator port of the initiator to the target ports of the selected set of target ports. The selected set of target ports can include a first target port of a first controller node, and a second target port of a second controller node. The first target port of the first controller node and the second target port of the second controller node are partner ports that provide for redundancy to provide fault tolerance in case of fault of one of the first and second controller nodes.

In some examples, the connection path definition instructions 302 can identify a target port of the controller nodes that exhibits poor health, and can exclude the identified target port exhibiting poor health from inclusion in the connection path.

Figure 4:
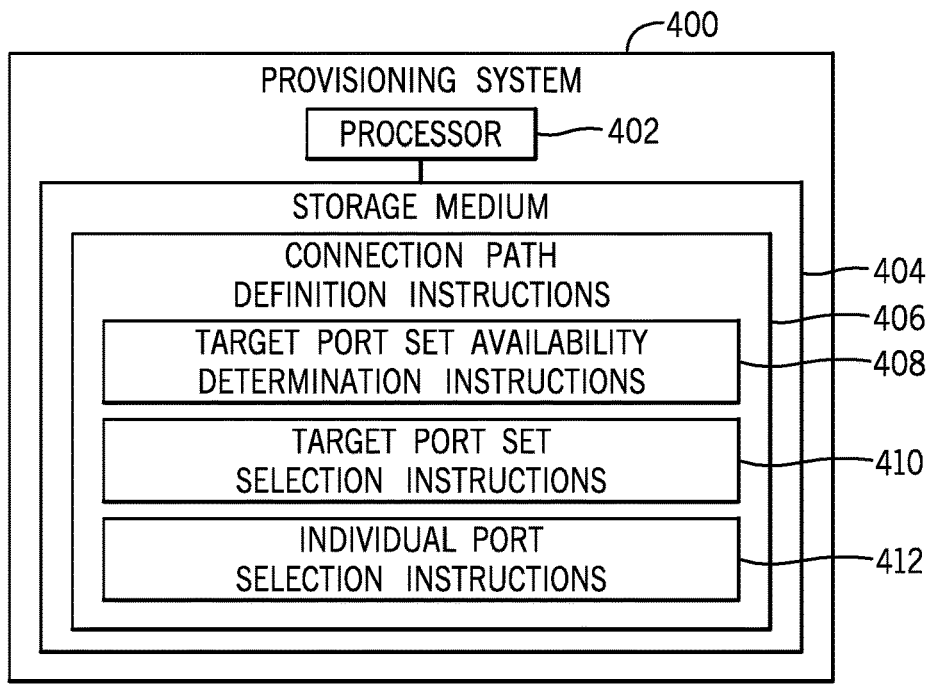
FIG. 4 is a block diagram of a provisioning system according to some examples.

FIG. 4 is a block diagram of a provisioning system 400 including a processor 402 (or multiple processors), and a storage medium 404 storing machine-readable instructions executable on the processor 402 to perform various tasks. Machine-readable instructions executable on a hardware processor can refer to the instructions executable on a single hardware processor or the instructions executable on multiple hardware processors.

The machine-readable instructions include connection path definition instructions 406 to define a connection path of an initiator to target ports of a plurality of controller nodes that manage access of data in a storage system. The connection path definition instructions 406 include target port set availability determination instructions 408 to determine whether sets of target ports are available, each set of target ports comprising target ports of different controller nodes of the plurality of controller nodes. The connection path definition instructions 406 include target port set selection instructions 410 to, in response to determining that the sets of target ports are available, determine loads of the sets of target ports, and select a selected set of target ports from among the sets of target ports for inclusion in the connection path based on the determined loads.

The connection path definition instructions 406 include individual port selection instructions 412 to, in response to determining that the sets of target ports are not available, determine loads of individual target ports of the plurality of controller nodes, and select a subset of the individual target ports for inclusion in the connection path based on the determined loads of the individual target ports.

Figure 5:
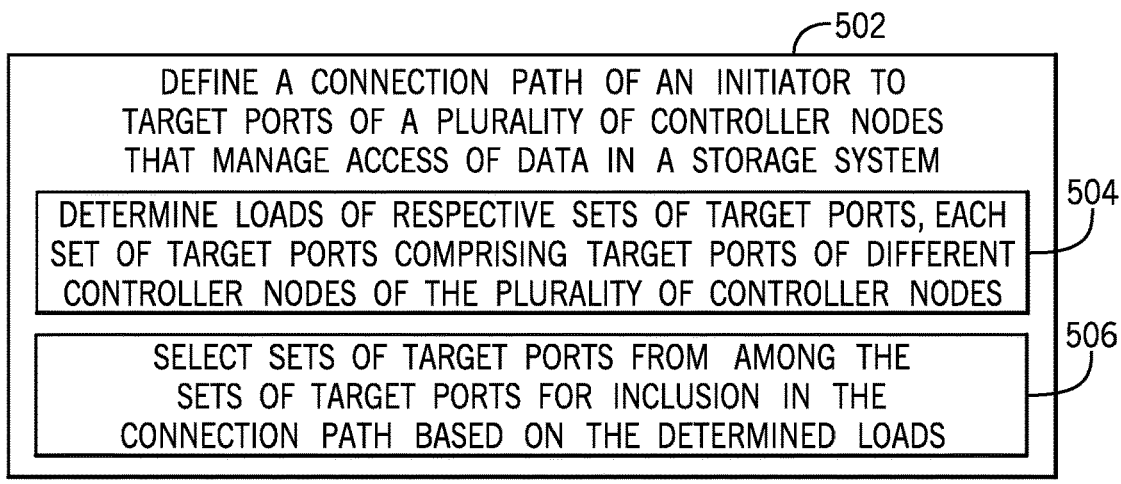
FIG. 5 is a flow diagram of a process according to further examples.

FIG. 5 is a flow diagram of a process of a provisioning system, such as the provisioning engine 112. The process of FIG. 5 includes defining (at 502) a connection path of an initiator to target ports of a plurality of controller nodes that manage access of data in a storage system. The defining includes determining (at 504) loads of respective sets of target ports, each set of target ports comprising target ports of different controller nodes of the plurality of controller nodes.

The defining includes selecting (at 506) sets of target ports from among the sets of target ports for inclusion in the connection path based on the determined loads.

A storage medium (e.g., 300 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions executable to cause a provisioning system to:
 as part of provisioning an initiator for access of a storage system, define a connection path of the initiator to target ports of a plurality of controller nodes that manage access of data in the storage system, the instructions to define the connection path comprising instructions executable to cause the provisioning system to:
 determine loads of respective sets of target ports;
 compare a load of a first set of target ports with a load of a second set of target ports; and
 based on the comparing, select one of the first and second sets of target ports as a selected set of target ports from among the sets of target ports for inclusion in the connection path based on the determined loads.

2. The non-transitory machine-readable storage medium of claim 1, wherein defining the connection path is performed as part of provisioning the initiator for access of the storage system.

3. The non-transitory machine-readable storage medium of claim 1, wherein defining the connection path is performed based on a policy that governs optimizing connection paths between initiators and the storage system.

4. The non-transitory machine-readable storage medium of claim 1, wherein selecting the selected set of target ports for inclusion in the connection path comprises connecting an initiator port of the initiator to the target ports of the selected set of target ports.

5. The non-transitory machine-readable storage medium of claim 1, wherein the selected set of target ports comprises a first target port of a first controller node of the plurality of controller nodes, and a second target port of a second controller node of the plurality of controller nodes.

6. The non-transitory machine-readable storage medium of claim 1, wherein the instructions are executable to cause the provisioning system to:
 identify presence of the sets of target ports,
 wherein the determining and the selecting are performed responsive to the identifying of the presence of the sets of target ports.

7. The non-transitory machine-readable storage medium of claim 1, wherein the instructions are executable to cause the provisioning system to:
 identify a target port of the plurality of controller nodes that exhibits poor health; and
 exclude the identified target port exhibiting poor health from inclusion in the connection path.

8. The non-transitory machine-readable storage medium of claim 1, wherein determining the loads of the respective sets of target ports comprises determining operational loads of the respective sets of target ports.

9. The non-transitory machine-readable storage medium of claim 1, wherein determining the loads of the respective sets of target ports comprises determining a number of initiators connected to each set of target ports of the respective sets of target ports.

10. The non-transitory machine-readable storage medium of claim 5, wherein the first target port of the first controller node and the second target port of the second controller node are partner ports that provide for redundancy to provide fault tolerance in case of fault of one of the first and second controller nodes.

11. The non-transitory machine-readable storage medium of claim 8, wherein the instructions are executable to cause the provisioning system to:
in response to a tie of the operational loads of the first and second sets of target ports:
compare a first number of initiators connected to the first set of target ports with a second number of initiators connected to the second set of target ports, and
based on the comparing of the first number with the second number, select one of the first and second sets of target ports as the selected set of target ports.

12. A provisioning system comprising:
a processor; and
a non-transitory storage medium storing instructions executable on the processor to:
define a connection path of an initiator to target ports of a plurality of controller nodes that manage access of data in a storage system, the instructions to define the connection path comprising instructions executable on the processor to:
determine whether sets of target ports are available, each set of target ports comprising target ports of different controller nodes of the plurality of controller nodes;
in response to determining that the sets of target ports are available, determine loads of the sets of target ports, and select a selected set of target ports from among the sets of target ports for inclusion in the connection path based on the determined loads; and
in response to determining that the sets of target ports are not available, determine loads of individual target ports of the plurality of controller nodes, and select a subset of the individual target ports for inclusion in the connection path based on the determined loads of the individual target ports.

13. The provisioning system of claim 12, wherein the target ports of the different controller nodes in each set of target ports comprise partner ports to provide redundancy for fault tolerance due to a fault of one of the different controller nodes.

14. The provisioning system of claim 12, wherein the loads of the sets of target ports comprises operational loads of the sets of target ports.

15. The provisioning system of claim 12, wherein the loads of the sets of target ports comprises numbers of initiators connected to the sets of target ports.

16. The provisioning system of claim 12, wherein the loads of the individual target ports comprise operational loads of the individual target ports.

17. The provisioning system of claim 12, wherein the loads of the individual target ports comprise numbers of initiators connected to the individual target ports.

18. The provisioning system of claim 12, wherein the instructions are to define the connection path as part of provisioning an initiator for access of a storage system.

19. A method performed by a system comprising a hardware processor, comprising:
to define a connection path of an initiator to target ports of a plurality of controller nodes that manage access of data in a storage system, as part of provisioning the initiator for access of the storage system:
determining loads of respective sets of target ports, each set of target ports comprising target ports of different controller nodes of the plurality of controller nodes; and
comparing a load of a first set of target ports with a load of a second set of target ports; and
based on the comparing, selecting one of the first and second sets of target ports from among the sets of target ports for inclusion in the connection path based on the determined loads.

20. The method of claim 19, wherein the determined loads are based on operational loads of the respective sets of target ports and numbers of initiators connected to the respective sets of target ports.

* * * * *